US009914550B1

(12) United States Patent
Price et al.

(10) Patent No.: US 9,914,550 B1
(45) Date of Patent: Mar. 13, 2018

(54) REUSABLE RESUPPLY SYSTEMS AND METHODS

(71) Applicant: LOCKHEED MARTIN CORPORATION, Bethesda, MD (US)

(72) Inventors: Robert Stephen Price, Littleton, CO (US); Larry Raymond Hines, Littleton, CO (US); John Charles Ringelberg, Pine, CO (US)

(73) Assignee: Lockheed Martin Corporation, Bethesda, MD (US)

( * ) Notice: Subject to any disclaimer, the term of this patent is extended or adjusted under 35 U.S.C. 154(b) by 157 days.

(21) Appl. No.: 14/951,214

(22) Filed: Nov. 24, 2015

Related U.S. Application Data

(60) Provisional application No. 62/086,163, filed on Dec. 1, 2014.

(51) Int. Cl.
*B64G 1/64* (2006.01)
*B64G 1/10* (2006.01)

(52) U.S. Cl.
CPC ............... *B64G 1/10* (2013.01); *B64G 1/645* (2013.01); *B64G 1/646* (2013.01)

(58) Field of Classification Search
CPC ........... B64G 1/10; B64G 1/645; B64G 1/646
See application file for complete search history.

(56) References Cited

U.S. PATENT DOCUMENTS

| 6,364,252 | B1 | 4/2002 | Anderman | |
|---|---|---|---|---|
| 6,523,783 | B2 * | 2/2003 | Lounge | B64G 1/007 244/172.4 |
| 6,669,148 | B2 * | 12/2003 | Anderman | B64G 1/007 244/172.4 |
| 7,387,279 | B2 | 6/2008 | Anderman et al. | |
| 2010/0038491 | A1 * | 2/2010 | Cepollina | B64G 1/1078 244/172.5 |
| 2017/0029138 | A1 * | 2/2017 | Bultel | B64G 1/007 |

* cited by examiner

*Primary Examiner* — Richard G Davis
(74) *Attorney, Agent, or Firm* — McDermott Will & Emery LLP

(57) ABSTRACT

A multi-use resupply system for a space-based platform may include a multi-use tug to swap old and new cargo containers on a launch vehicle upper stage. The system can rely on the launch vehicle upper stage to provide the function of cargo de-orbit and disposal. The launch vehicle upper stage may be provided with sufficient propellant and propulsion functionality to operate for a long enough period in space to maneuver a new cargo container to a rendezvous trajectory, support the swapping of cargo containers, and then perform a de-orbit burn with the old cargo container.

18 Claims, 15 Drawing Sheets

REUSABLE RESUPPLY SYSTEMS AND METHODS

CROSS-REFERENCES TO RELATED APPLICATIONS

This application claims priority to and the benefit of U.S. Provisional Patent Application No. 62/086,163, which is hereby incorporated by reference in its entirety.

STATEMENT REGARDING FEDERALLY SPONSORED RESEARCH OR DEVELOPMENT

Not applicable.

FIELD

The disclosure relates in general to sustaining of space operations, and in particular to, for example, without limitation, a reusable space platform resupply system such as an international space station cargo resupply service.

BACKGROUND

The description provided in the background section, including without limitation, any problems, features, solutions or information, should not be assumed to be prior art merely because it is mentioned in or associated with the background section. The background section may include information that describes one or more aspects of the subject technology.

To sustain operations at the International Space Station (ISS), it is necessary to deliver cargo from the ground on a regular basis and dispose of waste cargo with each mission. Systems currently in use today, to provide cargo services to and from the ISS, are single use solutions that are destroyed by reentry at the end of a single cargo delivery mission. Alternatively, such systems utilize a reentry capsule that is recovered and must be refurbished after each mission.

SUMMARY

The description in this summary section may provide some illustrative examples of the disclosure. This section is not intended to be a broad overview or to identify essential elements of the disclosure.

In accordance with an aspect of some embodiments disclosed herein, it has been realized that the current systems used to deliver cargo to the ISS and dispose of cargo from the ISS do not recover or reuse the propulsion system and the structure used to maneuver cargo to and from the ISS. Further, in the case of a single use system, avionics and rendezvous and proximity operations (RPO) sensors are also destroyed at the end of each mission. The present disclosure relates to a more cost-effective and efficient solution for delivering or carrying cargo to or from an orbiting platform such as the ISS.

For example, in some embodiments, a tug is provided with mechanical, electrical, communications, and propulsion components for self-attachment to a cargo container that is delivered to orbit by a launch vehicle. While attached to the cargo container, the tug transfers the cargo container from the launch vehicle to the ISS. Following off-loading of cargo from the container to the ISS, the container can be filled with items that are no longer needed at the ISS (sometimes described herein as "waste cargo" or "trash") and the tug then maneuvers the cargo container away from the ISS.

In some embodiments, the tug may perform a de-orbit burn to dispose of the trash. Further, in order to support more than one mission, the tug of these embodiments may re-orbit itself after performing the de-orbit burn. A tug capable of performing multiple round-trip maneuvers between the launch vehicle rendezvous point and the ISS and executing multiple de-orbit/re-orbit maneuvers may require an undesirably complex, expensive, and heavy propulsion system and sufficient propellant for these de-orbit/re-orbit maneuvers.

Therefore, in accordance with some embodiments, a system is provided for multi-use resupply of an orbiting or other space-based platform without requiring de-orbit and re-orbit of the tug, thereby reducing the maneuver and propellant demands on the tug. The system may include a multi-use tug that cooperates with an upper stage of a launch vehicle to perform resupply and waste removal operations.

In one or more implementations, a multi-use tug may be provided that includes first attachment features configured for coupling a first cargo container at a first attachment location; second attachment features configured for coupling a second cargo container at a second attachment location; and a grappling arm configured to capture the second cargo container and an attached launch vehicle upper stage, position the second cargo container for coupling to the second attachment features, and move the launch vehicle upper stage from the second cargo container to the first cargo container while the first cargo container is coupled to the first attachment features and the second cargo container is coupled to the second attachment features during space-based operations of the multi-use tug.

In one or more implementations, a method may be provided that includes maneuvering, with a multi-use tug, a first cargo container from a space-based platform to a delivery orbit; maneuvering, with a launch vehicle upper stage, a second cargo container to the delivery orbit; swapping, with a grappling arm of the multi-use tug, the launch vehicle upper stage from the second cargo container to the first cargo container; de-orbiting the first cargo container with the launch vehicle upper stage; and maneuvering, with the multi-use tug, the second cargo container from the delivery orbit to the space-based platform.

In one or more implementations, a multi-use resupply system for a space-based platform may be provided, the multi-use resupply system including a multi-use tug; and at least one upper stage vehicle of a launch vehicle, where the multi-use tug is configured to maneuver a first cargo container to a delivery orbit, where the at least one upper stage vehicle is configured to move a second cargo container to the delivery orbit, where the multi-use tug is configured to maneuver the second cargo container to the space-based platform, and where the at least one upper stage vehicle is configured to de-orbit the first cargo container.

It is to be understood that both the foregoing general description and the following detailed description are exemplary and explanatory and are intended to provide further explanation of the subject technology as claimed. It is also to be understood that other aspects may be utilized and changes may be made without departing from the scope of the subject technology.

BRIEF DESCRIPTION OF THE DRAWINGS

The accompanying drawings, which are included to provide further understanding and are incorporated in and constitute a part of this specification, illustrate disclosed embodiments and together with the description serve to explain the principles of the disclosed embodiments. In the drawings.

DETAILED DESCRIPTION

Figure 1:
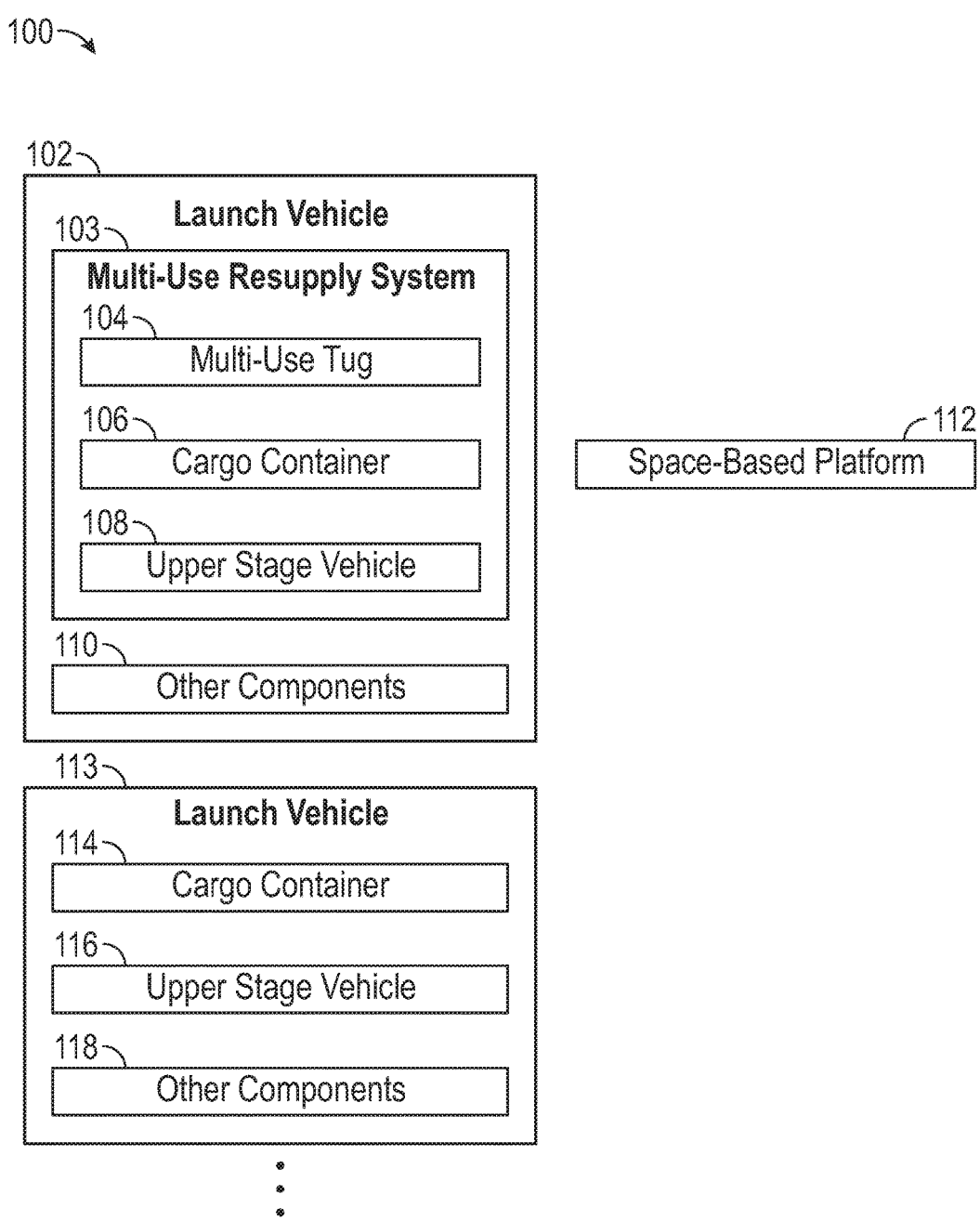
FIG. 1 illustrates a block diagram of an example of a spacecraft system that includes a multi-use resupply system in accordance with certain aspects of the disclosure.

It is understood that various configurations of the subject technology will become readily apparent to those skilled in the art from the disclosure, wherein various configurations of the subject technology are shown and described by way of illustration. As will be realized, the subject technology is capable of other and different configurations and its several details are capable of modification in various other respects, all without departing from the scope of the subject technology. Accordingly, the summary, drawings and detailed description are to be regarded as illustrative in nature and not as restrictive.

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology. Like components are labeled with identical element numbers for ease of understanding.

Some embodiments disclosed herein provide a multi-use supply system for a space-based platform such as a space station (e.g., a manned space station such as the ISS), a satellite, or other spacecraft as described herein. The multi-use supply system may include a multi-use tug configured to receive a cargo container from a launch vehicle, transport the cargo container to the space-based platform, and transport a waste container to a subsequently launched launch vehicle. For example, the multi-use supply system may be implemented as an ISS cargo resupply architecture, in some embodiments.

It has been discovered that, in some implementations, the design of a reusable tug can become undesirably large and expensive if too many functions are included for the tug to perform (e.g., shuttling cargo containers between a launch vehicle rendezvous point in low earth orbit (LEO) and the ISS in addition to providing propulsion for de-orbiting cargo containers).

In accordance with some embodiments, the multi-use supply system can be configured such that the only function performed by the tug is to shuttle cargo containers between a launch vehicle (e.g., at an LEO rendezvous point) and the space-based platform (e.g., the ISS or another spacecraft) and to swap cargo and waste containers as needed. Such embodiments can greatly reduce the size, complexity and cost of the tug.

In some embodiments, an upper stage of a launch vehicle is used to provide the function of waste cargo de-orbit and disposal. In some implementations, a multi-use tug can swap old cargo containers (e.g., waste containers loaded at the space-based platform with items no longer needed at the space-based platform) and new cargo containers on the launch vehicle upper stage. Further, the upper stage may be provided with sufficient propellant and propulsion systems to allow the upper stage to operate for a long enough period in space to maneuver to the rendezvous point, support the swapping of cargo containers and then perform a de-orbit burn with the old cargo container.

Accordingly, some embodiments disclosed herein can reduce the maneuvering requirements on the tug and therefore, reduce associated costs. In contrast, the current approach to an ISS cargo resupply service consumes expensive space hardware with each mission, requires refurbishment of space hardware with each mission, or requires a tug that is capable of many very large maneuvers, and is consequently driven to be very large and expensive. Further details and disclosure related to the present disclosure are included hereinafter.

FIG. 1 shows a block diagram of an example of a system including a multi-use supply system and a space-based platform. As shown in FIG. 1, system 100 includes a space-based platform 112 and a launch vehicle 102. Launch vehicle 102 may be provided with a multi-use resupply system 103 for repeatedly providing and removing items and materials to and from space-based platform 112.

Space-based platform 112 may be a space station (e.g., the ISS), a satellite, or other spacecraft in a low-Earth orbit (LEO), a high-Earth orbit (HEO), a geosynchronous orbit, an orbit of another planet, moon, or other Solar System body (e.g., an asteroid, a dwarf planet, or a comet) or otherwise maintained at a space-based location (as examples). Launch vehicle 102 may, for example, be a rocket-based launch vehicle for delivering multi-use resupply system 103 into space (e.g., into a delivery orbit). Launch vehicle 102 may include other components 110 such as one or more rocket motors, telemetry and other communications systems, stabilization systems, monitoring systems, guidance systems, tracking systems, a payload fairing, and/or other suitable systems and components for launching a multi-use resupply system and/or other payloads into space. For example, in one implementation, launch vehicle 102 may be implemented as an Atlas V rocket as manufactured by United Launch Alliance.

As shown in FIG. 1, multi-use resupply system 103 may include a multi-use space tug such as multi-use tug 104, one or more cargo containers such as cargo container 106 and one or more components of launch vehicle 102 such as upper stage vehicle 108. Launch vehicle 102 may be an expendable launch vehicle that delivers multi-use resupply system 103 into space. Once in orbit, multi-use tug 104 and cargo container 106 may separate from upper stage vehicle 108 while multi-use tug 104 and cargo container 106 are attached together. Upper stage vehicle 108 may then perform a de-orbit burn to return to Earth. Multi-use tug 104 may perform various on-orbit safekeeping operations such as solar panel deployment and housekeeping operations. Once initial operations are completed, multi-use tug 104 may be operated to maneuver cargo container 106 to space-based platform 112 (e.g., by moving cargo container 106 into a common orbit with space-based platform 112 for attachment of cargo container 106 to space-based platform 112).

Once attached, cargo from within cargo container 106 may be removed from the cargo container into and/or onto space-based platform 112 while the multi-use tug 104 remains attached to the container. For example, supplies for the ISS may be unloaded from cargo container 106 into the ISS. Waste items and materials can then be loaded into the same cargo container 106 and the cargo container 106 containing the waste items can be detached from space-based platform 112 and maneuvered by multi-use tug 104 to a loiter orbit (e.g., an orbit higher than the orbit of space-based platform 112) until a subsequent supply mission (e.g., until a launch time of a launch of the subsequent supply mission).

As shown in FIG. 1, another launch vehicle 113 may include another cargo container 114, upper stage vehicle 116, and other components 118 for launching cargo container 114 to the delivery orbit for a subsequent delivery (e.g., a resupply delivery) to space-based platform 112. Other components 118 may include as one or more rocket motors, telemetry and other communications systems, stabilization systems, monitoring systems, guidance systems, tracking systems, a payload fairing, and/or other suitable systems and components for launching a multi-use resupply system and/or other payloads into space. For example, in one implementation, launch vehicle 113 may be implemented as an Atlas V rocket as manufactured by United Launch Alliance.

As shown in FIG. 1, launch vehicle 113 does not include a multi-use tug. Multi-use tug 104 may be used to provide cargo container 106, now a waste container containing waste items from space-based platform 112, to upper stage vehicle 116 and to accept cargo container 114 from upper stage vehicle 116. Upper stage vehicle 116 can then de-orbit cargo container 106 for disposal and multi-use tug 104 may perform propulsion operations to maneuver cargo container 114 to space-based platform 112 so that supplies from cargo container 114 can be loaded to space-based platform 112 and additional waste items can be loaded into cargo container 114 for disposal during a further subsequent resupply mission.

Figure 2:
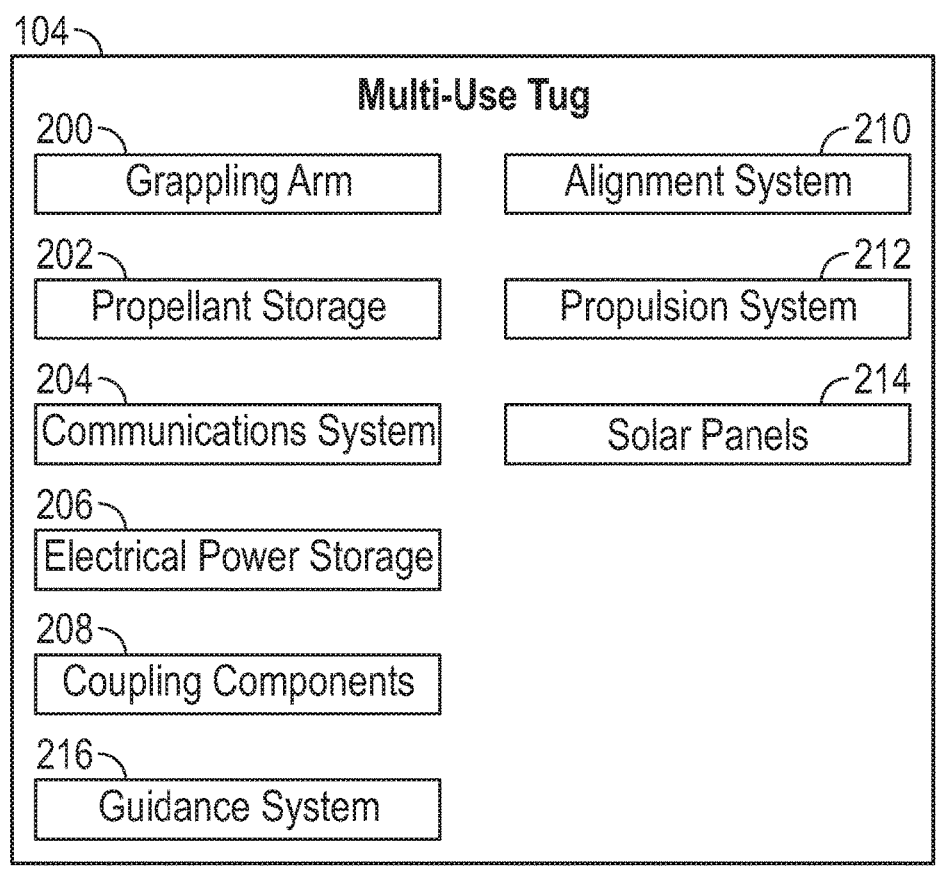
FIG. 2 illustrates a block diagram of an example of a multi-use tug of a multi-use resupply system in accordance with certain aspects of the disclosure.

FIG. 2 is a block diagram of an example of a multi-use tug 104. As shown in the example of FIG. 2, multi-use tug 104 may include a grappling arm 200, an alignment system 210 such as one or more components of a berthing alignment system, propulsion system 212 and propellant storage 202 for storing propellant to be used by propulsion system 212 and guidance system 216. Guidance and propulsion systems 212 and 216 may be operated for maneuvering tug 104 between various orbits and positions and for maintaining various orbits and positions in space for various resupply operations as described herein.

Multi-use tug may include other components and devices such as communications system 204, electrical power components such as solar panels 214 and electrical power storage 206 (e.g., one or more batteries coupled to the solar panels), and coupling components 208 (e.g., latches, grappling features, alignment marks, alignment structures, or the like).

Figure 3:
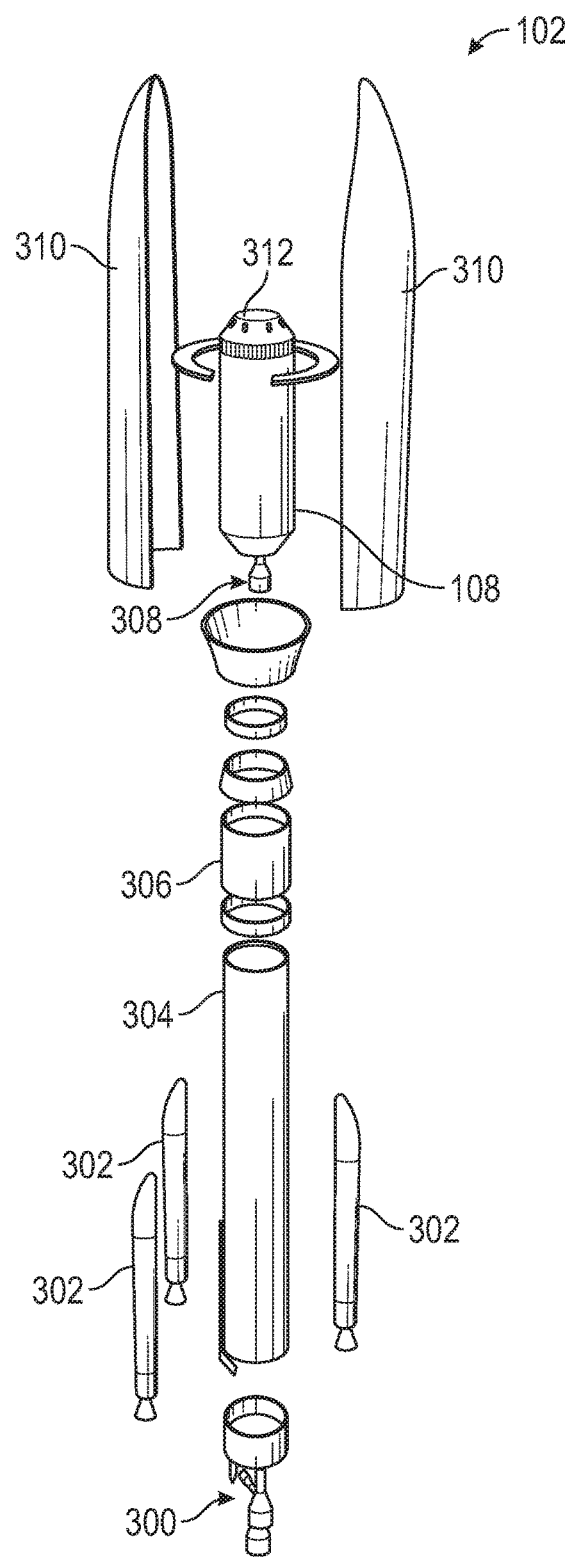
FIG. 3 illustrates an example of a launch vehicle for a multi-use resupply system in accordance with certain aspects of the disclosure.

FIG. 3 shows an exploded perspective view of an implementation of launch vehicle 102 of FIG. 1. As shown in FIG. 3, launch vehicle 102 (and similarly launch vehicle 113) may include components such as engine 300, a primary booster 304, one or more solid rocket boosters 302, one or more adapters such as adapter 306, and an upper stage vehicle 108 with an upper stage vehicle engine 308. Upper stage vehicle 108 may be at least partially disposed within a payload fairing 310 when vehicle 102 is configured for launch. Upper stage vehicle 108 may include coupling features 312 for attachment to a cargo container such as cargo containers 106 and/or 114 (see, e.g., FIG. 1).

Figure 4:
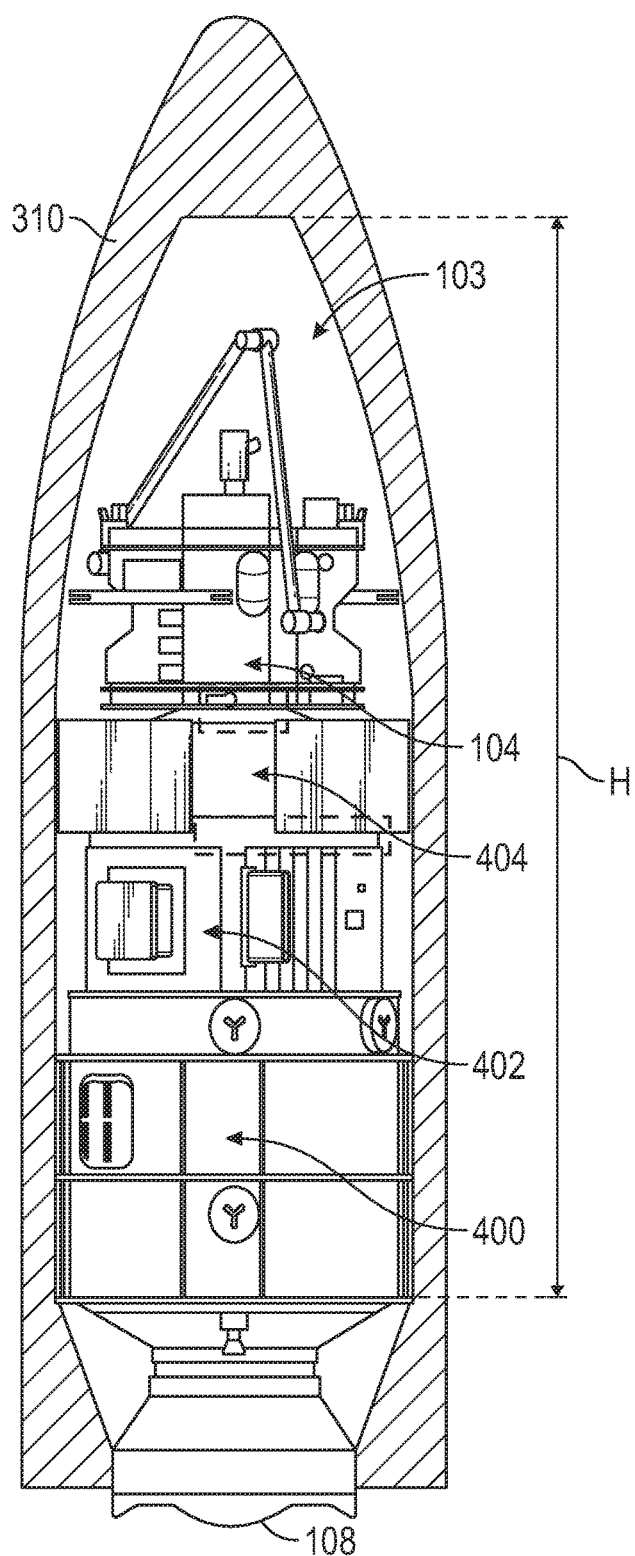
FIG. 4 illustrates a diagram of an example of a multi-use resupply system disposed in a launch vehicle in accordance with certain aspects of the disclosure.

FIG. 4 shows a side view of multi-use resupply system 103 disposed within payload fairing 310 with a portion of payload fairing 310 cutaway in the figure for clarity. Payload fairing 310 may have a height H which may be between, for example, 68 inches and 87 inches (e.g., height H may, in one implementation be approximately 77 inches).

In the example of FIG. 4, a cargo container is provided that includes cargo components 400, 402, and 404 attached between upper stage vehicle 108 and multi-use tug 104 which is shown in an undeployed configuration (e.g., with solar arrays and grappling arm(s) in a stowed position for launch). One or more of cargo components 400, 402, and 404 may be provided in combination to form cargo container 106.

Figure 5:
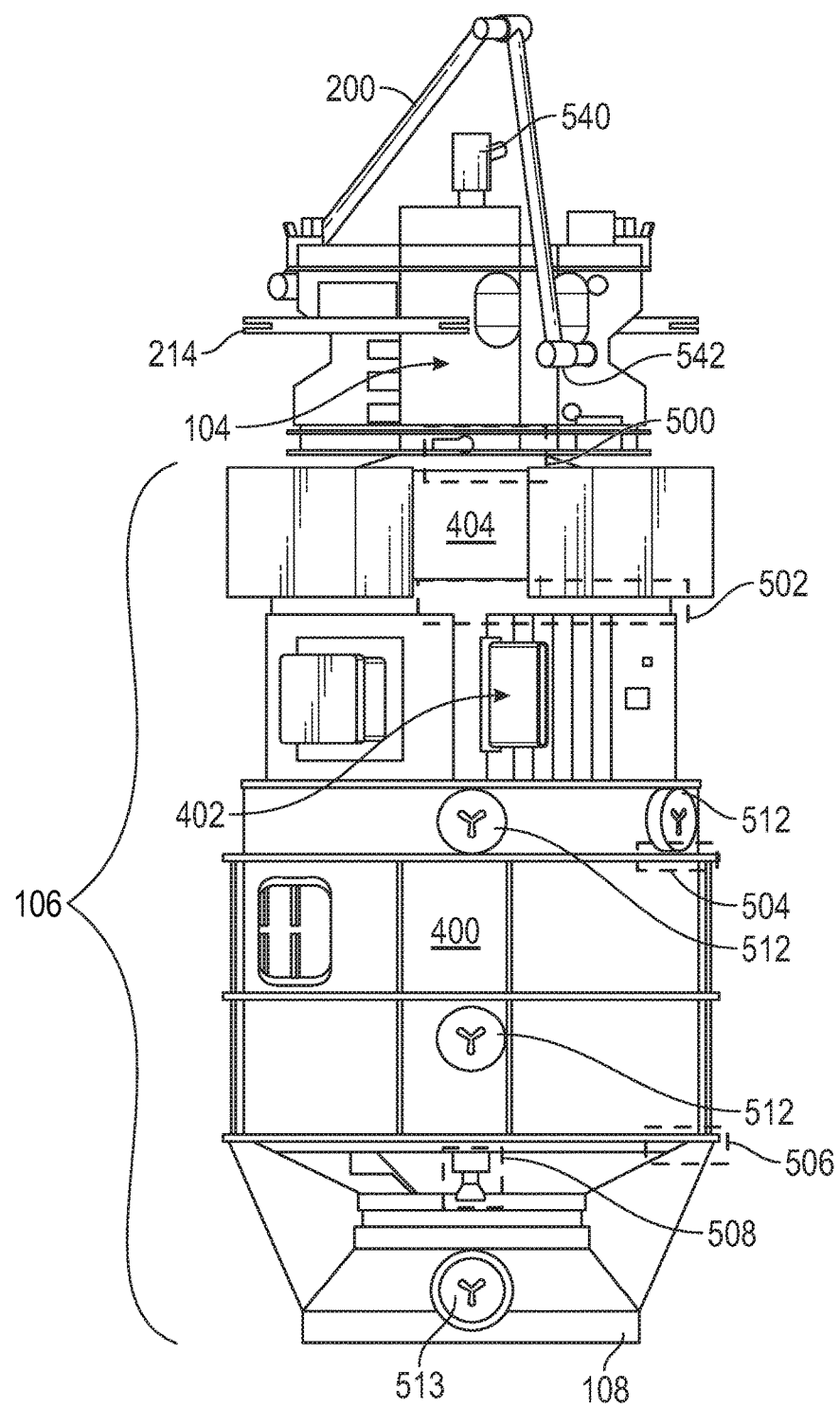
FIG. 5 illustrates a diagram of an example of a multi-use resupply system in accordance with certain aspects of the disclosure.

An enlarged view of system 103 in the configuration of FIG. 4 is shown in FIG. 5. Cargo component 400 may be a pressurized cargo carrier (PCC) configured to carry cargo in a pressurized environment. PCC 400 may, in one exemplary implementation, have an axial length of approximately 4.2 meters, a diameter of approximately 4.4 meters, a volume of approximately 42 cubic meters (e.g., the volume within an interior cavity of the container defined by an outer or inner housing structure and/or port or door that surround the interior cavity) and may be configured to hold approximately 5000 kg of cargo. First attachment features 506 may be used to attach PCC 400 to upper stage vehicle 108 during launch operations. Attachment features 506 may include a structural interface (e.g., an expanding tube separation joint ring), and an electrical interface (e.g., a separation electrical connector at the separation plane). Second attachment features 508 may be used to attach a different PCC 400 (e.g., a prior-launched PCC holding waste cargo) to upper stage vehicle 108 for de-orbit operations. Attachment features 508 may include a structural interface (e.g., one or more latches on the PCC such as three latches spaced 120° apart that capture and latch one or more corresponding clamp bars on upper stage vehicle 108), and may be free of electrical interface components.

Cargo component 402 may be an unpressurized cargo container (UCC) configured to carry cargo that does not require a pressurized environment for storage and transport. UCC 402 may, in one exemplary implementation, have an axial length of approximately 1.7 meters, a diameter of approximately 4.4 meters, a volume of approximately 17 cubic meters (e.g., the volume within an interior cavity of the container defined by an outer or inner housing structure and/or port or door that surround the interior cavity) and may be configured to hold approximately 1500 kg of cargo. Attachment features 504 may be used to attach UCC 402 to PCC 400. Attachment features 504 may include a structural interface (e.g., a bolted joint UCC ring to PCC ring flange interface) and an electrical interface (e.g., a harness-to-harness electrical connector).

Cargo component 404 may be a mission support module (MSM) configured to carry mission support materials such as hydrazine ($N_2H_4$) and Helium (He) for propulsion operations. Propulsion materials such as hydrazine and Helium that are stored in MSM 404 may be used by multi-use tug 104 during maneuvering of cargo components 400, 402, and 404 by tug 104 or may be used to refuel tug 104 for subsequent propulsion operations of tug 104. MSM 404 may, in one exemplary implementation, have an axial length of approximately 1.4 meters, a diameter of approximately 4.4 meters, and may be configured to hold approximately 2050 kg of hydrazine and 16 kg of Helium at approximately 4000 psi. Attachment features 502 may be used to attach MSM 404 to UCC 402. Attachment features 502 may include a structural interface (e.g., a bolted joint coupling a top plate of the UCC to the MSM at multiple locations) and an electrical interface (e.g., a harness-to-harness electrical connector).

In configurations in which an MSM is provided with the cargo container, MSM 404 may be detachably coupled to multi-use tug 104 using attachment features 500. In other configurations, attachment features 500 may be used to attach multi-use tug 104 directly to UCC 402 or directly to PCC 400. For example, an MSM may be included in cargo container 106 only for missions in which refueling of multi-use tug 104 is desired (e.g., every mission, every other mission, every third mission, every fourth mission, or as needed depending on mission and/or cargo demands).

Attachment features 500 may operate differently during a first mission (e.g., a delivery mission for tug 104 in which tug 104 and cargo container 106 are coupled during launch) and subsequent missions (e.g., resupply missions during which cargo container 106 is not attached to tug 104 during the launch). For example, in a first mission, attachment features 500 may include a structural interface (e.g., two mating rings with pin-puller shear pins that are activated at the beginning of a first swap operation for tug 104), an electrical interface (e.g., an electrical connector on a bracket that takes the place of an electrical grapple fixture, the connection actuated by an end effector), and a fluid interface (e.g., one or more mechanisms on tug 104 configured to actuate a quick disconnect connection). In a subsequent mission, attachment features 500 may include, for example, a structural interface (e.g., two mating rings and an end effector and grapple fixture, berthing features, docking features, and/or other structural interface structures), an electrical interface (e.g., an end effector electrical mate to the grapple fixture, the connection actuated by an end effector), and a fluid interface (e.g., one or more mechanisms on tug 104 configured to actuate a quick disconnect connection)

Grappling arm 200 may have an end effector 542 configured to interface with grappling features of container 106 (e.g., one or more of grappling features 512 disposed on PCC 400 and/or one or more grappling features 513 disposed on upper stage vehicle 108) for various mating, un-mating, repositioning, and maneuvering operations. Multi-use tug 104 may also include mating features 540 (e.g., berthing structures) configured to form an additional attachment point for attaching a cargo container with or without an attached upper stage vehicle.

Multi-use tug 104 may, in one exemplary implementation, include storage for approximately 2195 kg of hydrazine and 4 kg of Helium at approximately 4000 psi for propulsion operations. In this implementation, multi-use tug 104 may have an axial length (including attachment features 540) of approximately 2.4 meters and may have electrical power storage and generation capable of providing approximately 6500 watts of power.

Figure 6:
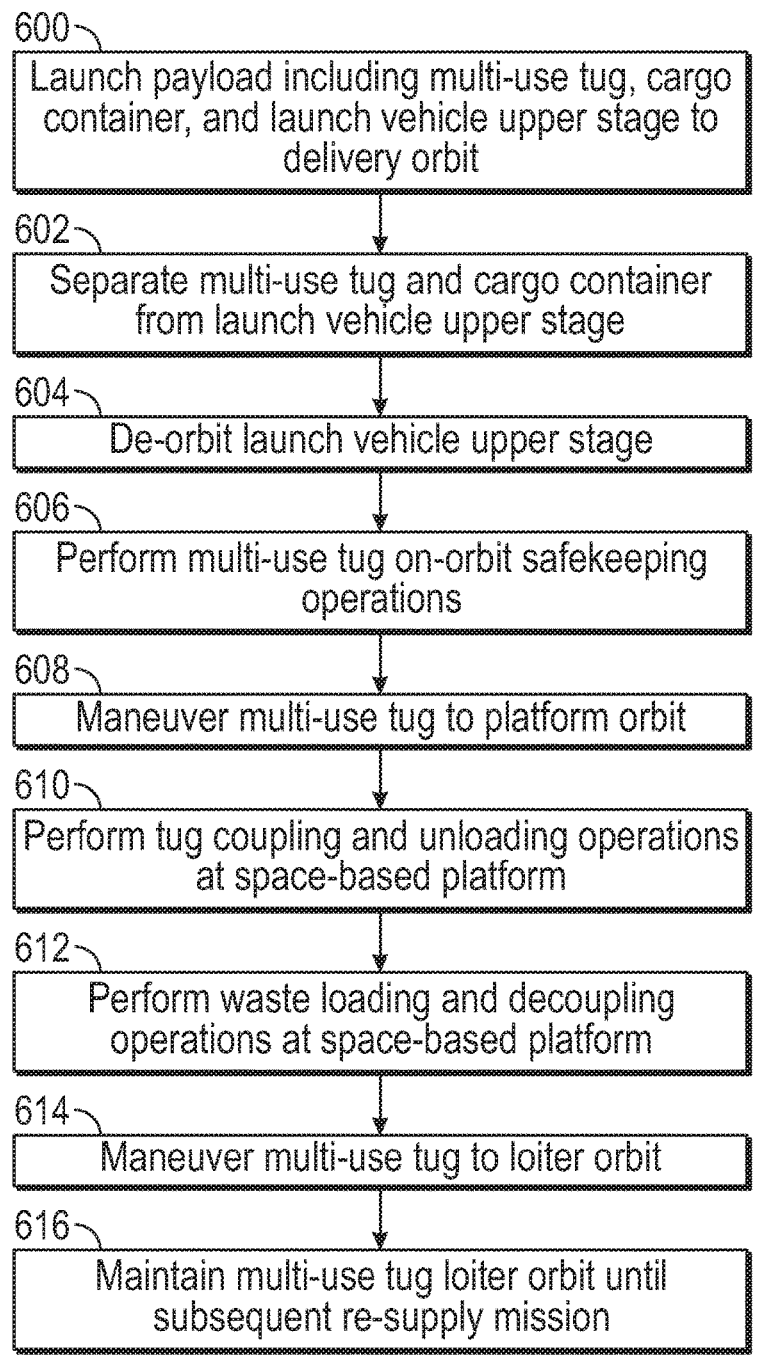
FIG. 6 is a flow chart showing an illustrative process for a first use of a multi-use resupply system in accordance with certain aspects of the disclosure.
Figure 7:
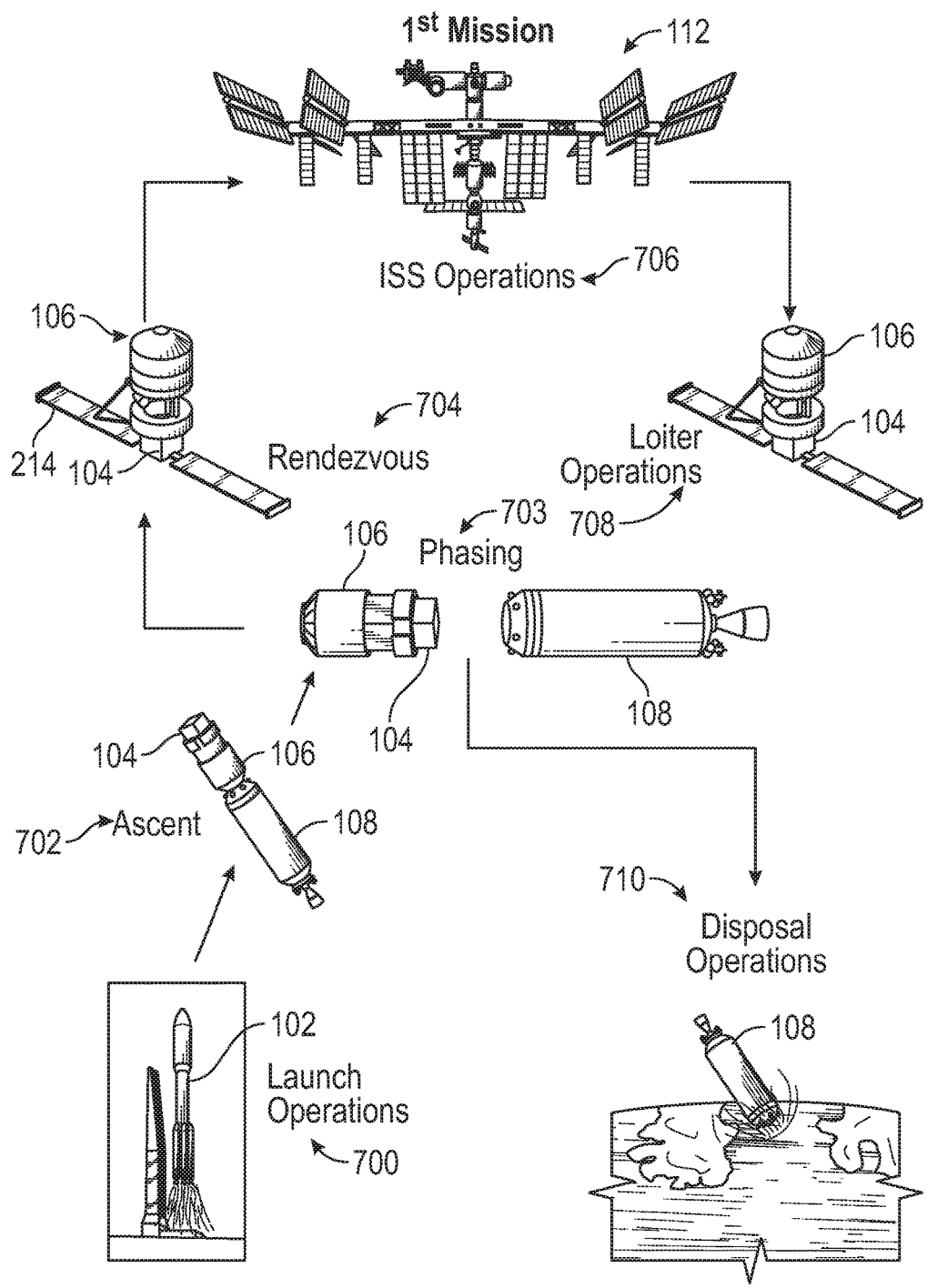
FIG. 7 is a diagram illustrating various stages of a first use of a multi-use resupply system in accordance with certain aspects of the disclosure.
Figure 8:
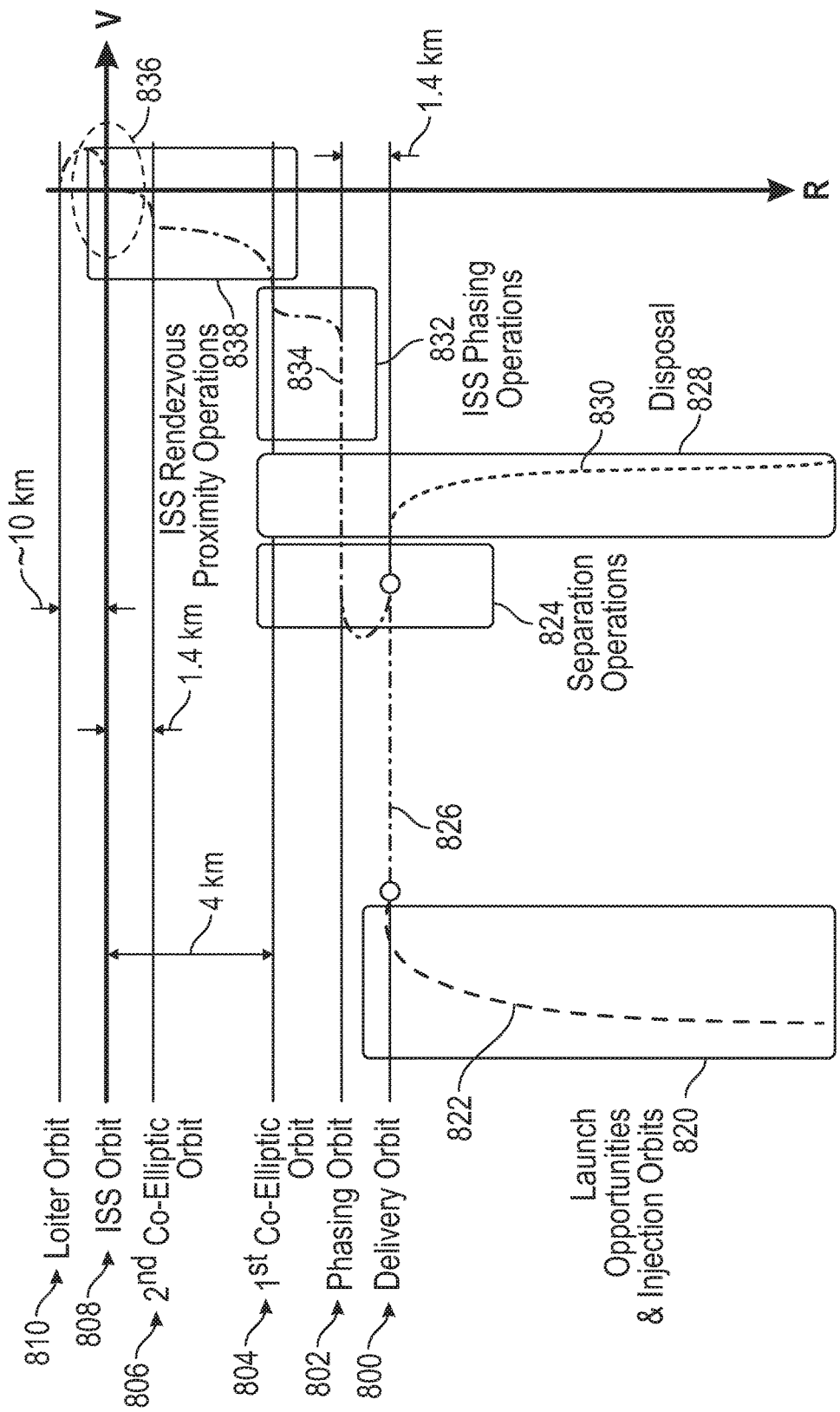
FIG. 8 is an on-orbit operations diagram illustrating orbital movements of various components of a multi-use resupply system at various stages of a first use of the multi-use resupply system in accordance with certain aspects of the disclosure.

FIGS. 6-13 show various aspects of cargo supply and resupply operations using a multi-use resupply system as described herein, in accordance with various embodiments. In particular, FIGS. 6, 7, and 8 show various aspects of a first supply mission in which a multi-use tug is launched into orbit with a cargo container and FIGS. 9, 10, 11, 12, and 13 show various aspects of a subsequent (e.g., second or later) resupply mission in which a multi-use tug is used to swap an old cargo container containing waste items with a new cargo container containing supply items for the space-based platform.

Illustrative operations that may be performed for a first supply mission with a multi-use resupply system are shown in FIG. 6.

At block 600, a payload may be launched (e.g., using a launch vehicle such as launch vehicle 102 of FIG. 1) into a delivery orbit. The payload may include a multi-use tug, a cargo container, and a launch vehicle upper stage as described herein. For the first launch, from liftoff through spacecraft/launch vehicle separation, multi-use tug 104 may use a telemetry and data relay satellite system (TDRSS) band such as a TDRSS S-band to communicate with ground-based monitors and controllers. For all launches, the launch vehicle may transmit telemetry data to a ground-based spacecraft operations center (SOC) through range ground stations from liftoff through early ascent. Range ground stations (e.g., TEL-4, Jonathan Dickenson Missile Tracking Annex (JDMTA), and Antigua ground stations) may be used to provide launch vehicle telemetry support during early launch ascent phases. During ascent, the launch vehicle may reduce the telemetry data rate for compatibility with TDRSS and perform a roll to orient an antenna along a TDRSS line of sight, which remains the primary launch vehicle telemetry collection asset for the remainder of the flight. Supplemental support may be provided via other communications networks such as the Air Force Satellite Control Network (AFSCN) ground stations based on visibility and a predicted radio-frequency (RF) link. Both TDRSS and AFSCN data may be available real-time.

At block 602, the multi-use tug and cargo container (e.g., the cargo container attached to the multi-use tug) may be separated from the launch vehicle upper stage.

At block 604, the launch vehicle upper stage may be de-orbited (e.g., by performing a de-orbit burn with the launch vehicle upper stage).

At block 606, multi-use tug on-orbit safekeeping operations may be performed. On-orbit safekeeping functions may include solar array deployments and vehicle housekeeping operations.

At block 608, the multi-use tug may be maneuvered (e.g., using its own propulsion systems) to a platform orbit at which a space-based platform such as the ISS is orbiting.

At block 610, tug coupling and unloading operations may be performed at the space-based platform. For example, the cargo container and the attached multi-use tug may be berthed or docked (e.g., using a grappling arm and/or other mounting or berthing features of the space-based platform) to the space-based platform such that the cargo in the cargo container may be accessed and loaded onto and/or into the space-based platform. For example, while the multi-use tug is attached to a first end of the cargo container, an opposing second end of the cargo container may be berthed to the space station and opened so that the cargo therein can be unloaded by the space station astronauts.

At block 612, waste loading and decoupling operations may be performed at the space-based platform. For example, while the multi-use tug is attached to the first end of the cargo container and the second opposing second end of the cargo container is attached to the space station and open, waste cargo can be loaded into the cargo container by the space station astronauts, the cargo container can be closed, and the cargo container can be detached from the space station while the multi-use tug is attached to the cargo container at the first end. The operations of blocks 610 and 612 may be controlled automatically and/or by human operators at the space-based platform and/or at a ground station mission control center for the space-based platform. In various embodiments, operations of the multi-use tug other than berthing and loading operations may be controlled by the same or a different ground station control center.

At block 614, the multi-use tug may maneuver the multi-use tug and its attached waste cargo container to a loiter orbit (e.g., an orbit that is higher than the platform orbit).

At block 616, the multi-use tug may maintain cargo container 106 (and tug 104 itself) at the loiter orbit until the time of a subsequent resupply mission.

FIG. 7 is a diagram showing the configuration of various components of a multi-use resupply system at various stages of the first mission as described above in connection with FIG. 6 in an implementation for supplying and resupplying the international space station (as an example). As shown in FIG. 7, launch operations 700 may be performed with a launch vehicle 102 leading to ascent 702 of an integrated stack that includes multi-use tug 104, cargo container 106 and upper stage vehicle 108.

Following ascent, upper stage vehicle 108 may be separated from cargo container 106 and attached multi-use tug 104. Disposal operations 710 may be performed for upper stage vehicle 108 (e.g., by performing a de-orbit burn with upper stage vehicle 108). For example, after performing maneuvers to safely back away from upper stage vehicle 108, multi-use tug 104 may perform a departure trajectory maneuver that raises apogee a minimum of 1.4 km above upper stage vehicle 108. With this trajectory, multi-use tug 104 initially drifts in front, then above and then starts to fall behind the upper stage vehicle 108. Once multi-use tug 104 reaches a safe distance, upper stage vehicle 108 starts disposal operations.

Before, during, or after disposal operations 710, phasing operations 703 may be performed with multi-use tug 104 to orient, position, and maneuver tug 104 and container 106 to meet space-based platform 112 (e.g., the ISS) at a platform orbit. Rendezvous operations 704 may be performed to position cargo container 106 for berthing with platform 112 while multi-use tug is fully deployed and attached to cargo container 106. Phasing and maneuvering of tug 104 and container 106 may be performed using the propulsion systems of tug 104.

ISS operations 706 (e.g., docking and/or berthing operations, loading operations, and unloading operations) may be performed at space-based platform 112. Following loading of unwanted cargo into cargo container 106, cargo container 106 and tug 104 may be detached from platform 112 and tug 104 may maneuver tug 104 and container 106 to a loiter orbit and perform loiter operations 708 to maintain the loiter orbit until the time of a subsequent resupply mission.

As shown in FIG. 8, for the first mission, an injection altitude may be tailored such that, after separation from upper stage vehicle 108, tug 104 and container 106 will be in a delivery orbit 800 in which a worst case 360° phasing with the ISS can be accommodated and still meet the cargo delivery requirement for the mission (e.g., a 96 hour cargo delivery time limit). The delivery orbit 800 may be a 254.5 km altitude, 51.6° inclination orbit. With this strategy, the launch vehicle may be provided with the performance to launch on any day.

After injection, multi-use tug 104 and container 106 separate from upper stage vehicle 108 and, after reaching a safe distance from upper stage vehicle 108, multi-use tug may begin initial on-orbit safekeeping functions such as solar array deployments and vehicle housekeeping. Risk reduction testing operations for the first mission may also be performed. Time and propellant may be reserved to allow for optional testing of the rendezvous, proximity-operations and capture operations with an upper stage launch vehicle for later recurring missions.

In the example, of FIG. 8, line 822 shows the trajectory of the launch vehicle to delivery orbit 800 during launch opportunities and injection orbits portion 820 of the first mission. Line 826 shows the trajectory of multi-use resupply system 103 leading to separation operations 824 from upper stage vehicle 108. Following separation operations 824, disposal operation 828 for upper stage vehicle 108 are indicated by line 830 and line 834 indicates various ISS phasing operations 832 and ISS rendezvous proximity operations 838 for multi-use tug 104 and attached cargo container 106 during which multi-use tug 104 may maneuver container 106 between a phasing orbit 802, a first co-elliptic orbit 804, a second co-elliptic orbit 806, and the platform orbit (e.g., the ISS orbit) 808. Phasing operations 832 and rendezvous proximity operations 838 may be performed to properly align, position, and phase container 106 for berthing with space-based platform 112. Portion 836 of the diagram of FIG. 8 shows maneuvering of cargo container 106 (with waste items therein) by multi-use tug 104 to a loiter orbit 810. In the example, of FIG. 8, the loiter orbit 810 is approximately 10 km above the platform orbit 808.

Figure 9:
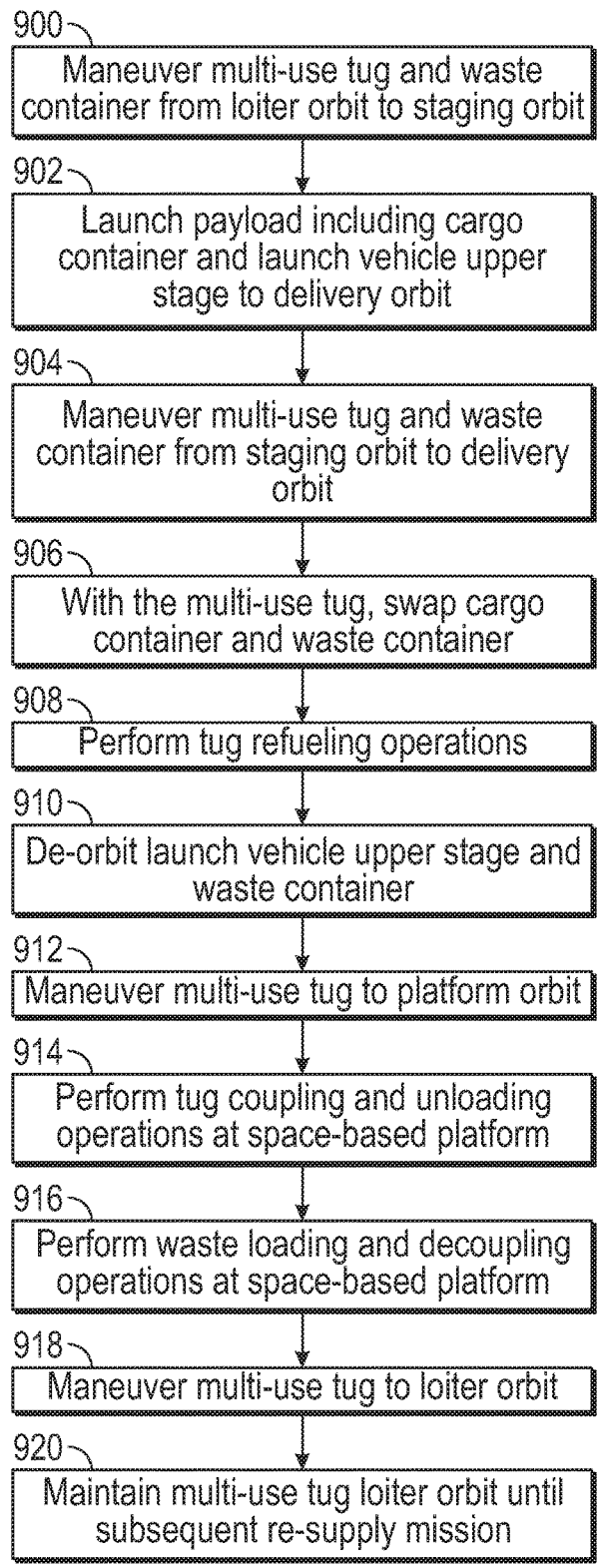
FIG. 9 is a flow chart showing an illustrative process for a resupply use of a multi-use resupply system in accordance with certain aspects of the disclosure.

Illustrative operations that may be performed for a resupply (or recurring) mission with a multi-use resupply system are shown in FIG. 9.

At block 900, the multi-use tug and attached waste container may be maneuvered, using the propulsion system of the multi-use tug, from the loiter orbit to a staging orbit (e.g., a two-day phase repeating staging orbit) in preparation for the arrival of a new cargo container and upper stage vehicle. The staging orbit may, for example, be a 351.4 km altitude, 51.6° inclination orbit. The multi-use tug may maneuver the waste container to the staging orbit at or near the launch time (e.g., within approximately two days) of the resupply mission.

At block 902, a new payload may be launched (e.g., using a launch vehicle such as launch vehicle 113 of FIG. 1) into a delivery orbit. The payload may include a new cargo container, and a new launch vehicle upper stage attached thereto. The new payload may be launched once the tug 104 and container 106 is in position at the staging orbit, and the new upper stage vehicle (e.g., upper stage vehicle 116) may deliver the new arrival container (e.g., cargo container 114) to a precision target (e.g., 1.4 km below tug 104 and container 106) where a near field rendezvous operation can commence immediately after on-orbit checkouts complete. The staging orbit may be a two-day phase repeating staging orbit that may be used to provide launch opportunities every other day that will not require significant amounts of time or propellant. In the case of a short (e.g., 2 day) launch delay, multi-use tug 104 may have propellant reserves to correct for the drift in the ISS-relative planar alignment. If longer delays are expected, an alternate long-term repositioning operation may be performed in which multi-use tug 104 returns to an altitude slightly above the space-based platform (e.g., the ISS) to counteract any additional planar drift. At an appropriate time before the next launch attempt, multi-use tug 104 and the waste container 106 return to the 2-day phase-repeating staging orbit.

At block 904, the multi-use tug and waste container may be maneuvered by tug 104 from the staging orbit to the delivery orbit to rendezvous with the new cargo container and upper stage vehicle. During launch operations for resupply launches, cargo container 114 will not have access to power from the multi-use tug until rendezvous therewith. The PCC of the cargo container 114 may include a battery that provides power to the new cargo container from launch until rendezvous with multi-use tug 104. Multi-use tug 104 may provide power to the new cargo container once berthed thereto. Propellant for multi-use tug 104 may be managed to ensure sufficient reserves to accommodate repositioning for several launch delays.

At block 906, the new cargo container and the waste container can be swapped by the multi-use tug. Swapping the new cargo container and the waste container may include attaching the new upper stage vehicle to the waste container and attaching the new cargo container to the multi-use tug with the grappling arm of the multi-use tug. In this way, the grappling arm of the multi-use tug may be used to swap the launch vehicle upper stage from the new cargo container to the waste cargo container. Further details of cargo container swapping operations and described hereinafter in connection with, for example, FIGS. 10 and 13.

At block 908, refueling operations may optionally be performed for the multi-use tug (e.g., by transferring propellant or other materials from a mission support module of the new cargo container to the multi-use tug).

At block 910, the new launch vehicle upper stage and its attached waste cargo container released from multi-use tug 104 may be de-orbited (e.g., by performing a de-orbit burn with the new launch vehicle upper stage while the waste cargo container is attached to the new launch vehicle upper stage).

At block 912, the multi-use tug may be maneuvered (e.g., using its own propulsion systems) to the platform orbit at which the space-based platform such as the ISS is orbiting.

At block 914, tug coupling and unloading operations may be performed at the space-based platform. For example, the new cargo container and the attached multi-use tug may be berthed or docked to the space-based platform such that the new cargo in the new cargo container may be accessed and loaded onto and/or into the space-based platform. For example, while the multi-use tug is attached to a first end of the new cargo container, an opposing second end of the new cargo container may be berthed to the space station and opened so that the new cargo therein can be unloaded by the space station astronauts.

At block 916, waste loading and decoupling operations may be performed at the space-based platform. For example, while the multi-use tug is attached to the first end of the new cargo container and the opposing second end of the new cargo container is attached to the space station and open, waste cargo can be loaded into the cargo container by the space station astronauts, the new cargo container can be closed, and the new cargo container can be detached from the space station while the multi-use tug is attached to the new cargo container at the first end. The operations of blocks 914 and 916 may be controlled automatically and/or by human operators at the space-based platform and/or at a ground station mission control center for the space-based platform. In various embodiments, operations of the multi-use tug other than berthing and loading operations may be controlled by the same or a different ground station control center.

At block 918, the multi-use tug may maneuver the multi-use tug and its attached new waste cargo container to a loiter orbit (e.g., an orbit that is higher than the platform orbit).

At block 920, the multi-use tug may maintain the loiter orbit with the new waste cargo container until the time of a further subsequent resupply mission.

Figure 10:
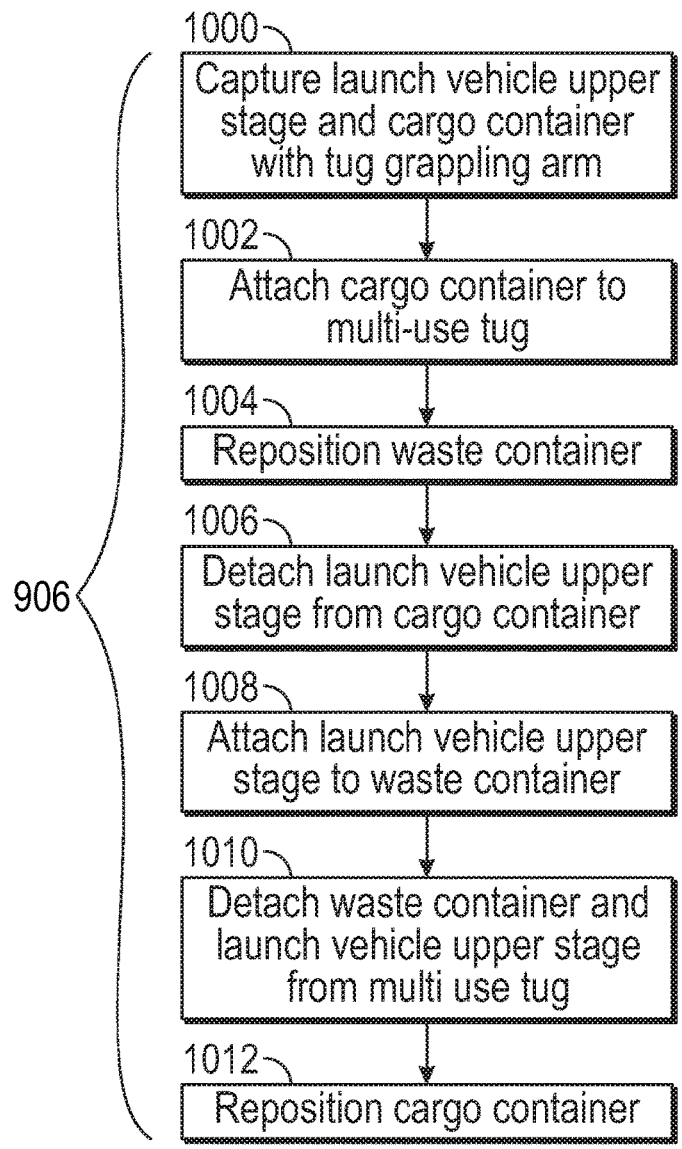
FIG. 10 is a flow chart showing an illustrative process for swapping a cargo container and a waste container during a resupply use of a multi-use resupply system in accordance with certain aspects of the disclosure.

Illustrative operations that may be performed for swapping a cargo container and a waste container with a multi-use tug, as described above in connection with block 906 of FIG. 9, are shown in FIG. 10, according to an embodiment.

At block 1000, the new launch vehicle upper stage and cargo container may be captured with a tug grappling arm (see, e.g., tug grappling arm 200 of FIGS. 2 and 5). The new launch vehicle upper stage and cargo container may be captured with the tug grappling arm while the waste container is attached, at a first attachment location on the tug.

At block 1002, the new cargo container with the attached new upper stage vehicle may be attached to the multi-use tug at a second attachment location (e.g., using berthing features and/or an end effector of the tug and corresponding features on the new cargo container).

At block 1004, the waste container may be repositioned to a new orientation at the first attachment location on the multi-use tug using the tug grappling arm. In the new orientation, the waste cargo container may be attached on a sidewall thereof to the first attachment location on the tug in an orientation that is substantially parallel to the orientation of the new cargo container.

At block 1006, the new launch vehicle upper stage may be detached from the new cargo container (e.g., by disengaging attachment features 506 of FIG. 5) and removed from the new cargo container using the tug grappling arm.

At block 1008, the new launch vehicle upper stage may be moved, with the grappling arm, to the waste cargo container and attached to the waste cargo container (e.g., using attachment features 508 of FIG. 5).

At block 1010, the waste container with the attached new upper stage vehicle may be detached from the multi-use tug.

At block 1012, the new cargo container may be repositioned, using the tug grappling arm, to a cargo delivery orientation on the multi-use tug.

Figure 11:
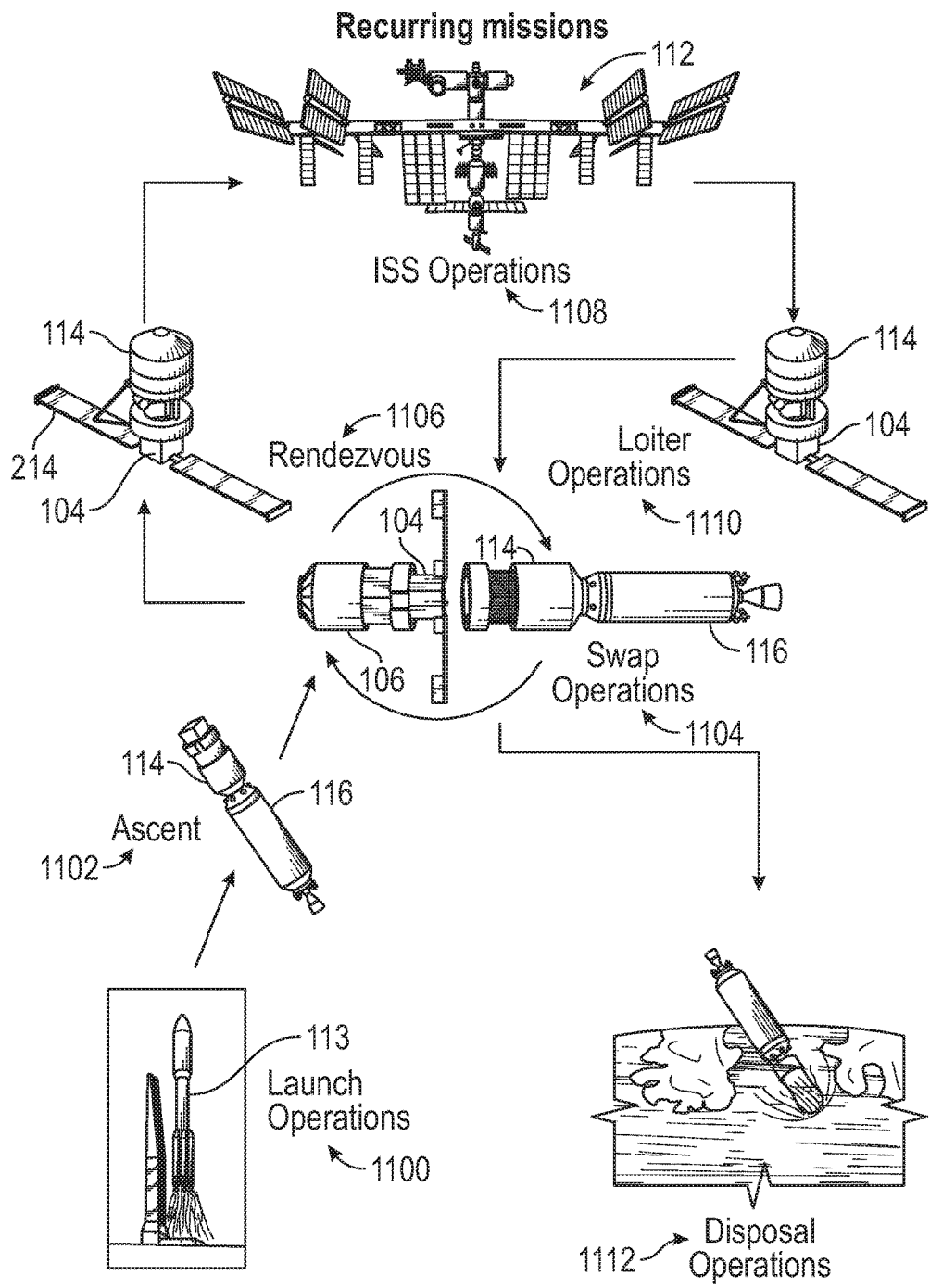
FIG. 11 is a diagram illustrating various stages of a resupply use of a multi-use supply system in accordance with certain aspects of the disclosure.

FIG. 11 is a diagram showing the configuration of various components of a multi-use resupply system at various stages of a resupply mission as described above in connection with FIGS. 9 and 10 in an implementation for supplying and resupplying the international space station (as an example). As shown in FIG. 11, launch operations 1100 may be performed with a launch vehicle 113 leading to ascent 1102 of an integrated stack that includes cargo container 114 and upper stage vehicle 116.

For the recurring mission, multi-use tug 104 may be pre-positioned in the 2-day phase-repeating staging orbit 1.4 km above the delivery orbit of cargo container 114 and upper stage vehicle 116. With the use of, for example, GPS navigation, upper stage vehicle 116 may deliver cargo container 114 to a designated target such that multi-use tug 104 can commence container rendezvous and proximity operations immediately after orbit insertion check-outs and minimal phasing are complete.

Following ascent, swap operations 1104 may be performed to swap waste container 106 with new cargo container 114 (e.g., as described above in connection with the operations of FIG. 10).

Following the swap, disposal operations 1112 may be performed for upper stage vehicle 116 and waste container 106 (e.g., by performing a de-orbit burn with upper stage vehicle 116 while waste container 106 is attached thereto). Before, during, or after disposal operations 1112, rendezvous operations 1106 to position cargo container 114 for berthing with platform 112 may be performed while multi-use tug is fully deployed and attached to cargo container 114. Phasing and maneuvering of tug 104 and container 114 may be performed using the propulsion systems of tug 104.

ISS operations 1108 (e.g., docking and/or berthing operations, loading operations, and unloading operations) may be performed at space-based platform 112. Following loading of additional unwanted cargo into cargo container 114, cargo container 114 and tug 104 may be detached from platform 112 and tug 104 may maneuver tug 104 and container 114 to the loiter orbit and perform loiter operations 1110 to maintain the loiter orbit until the time of a subsequent resupply mission.

Figure 12:
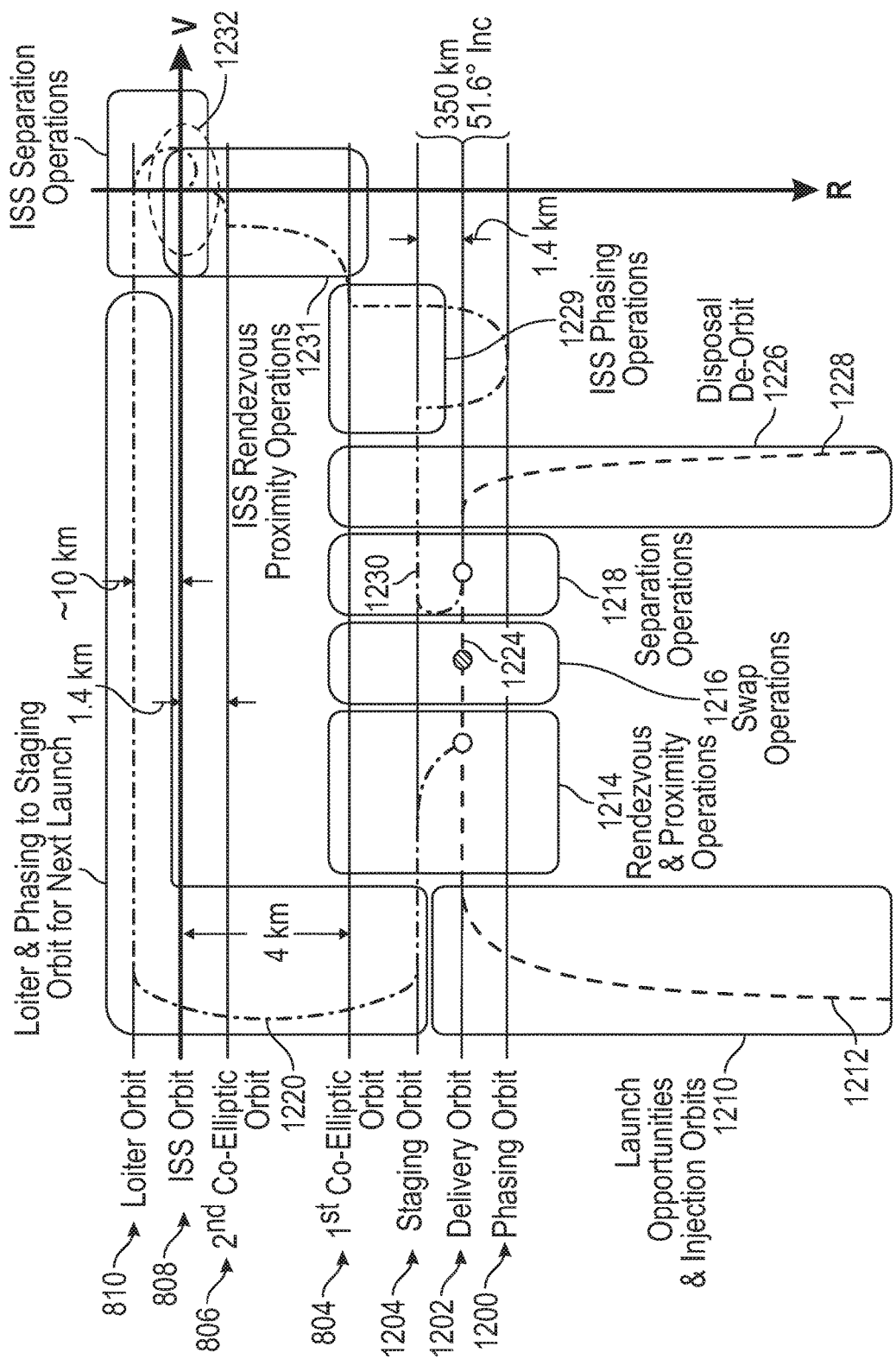
FIG. 12 is an on-orbit operations diagram illustrating orbital movements of various components of a multi-use resupply system at various stages of a resupply use of the multi-use resupply system in accordance with certain aspects of the disclosure.

The recurring mission container rendezvous and proximity operations trajectory design is illustrated in FIG. 12. The exemplary strategy of FIG. 12 uses a single co-elliptic approach with the waste container from above and in front. As indicated by line 1220 of FIG. 12, for the resupply mission, multi-use tug 104 may be pre-positioned in the 2-day phase-repeating staging orbit 1204. Staging orbit 1204 may, for example, be 1.4 km above the delivery orbit 1202 for the new container and upper stage vehicle. The delivery orbit 1202 may, for example, be a 254.5 km altitude, 51.6° inclination orbit.

In the example, of FIG. 12, line 1212 shows the trajectory of the new launch vehicle to delivery orbit 1202 during launch opportunities and injection orbits portion 1210 of the first mission. As shown, the multi-use tug maneuvers the waste container from the staging orbit to the delivery orbit during rendezvous and proximity operations 1214. Line 1224 shows the trajectory of multi-use tug 104, waste container 106, new upper stage vehicle 116, and new cargo container 114 during swap operations 1216 at the delivery orbit. Following swap operations 824, disposal operation 1226 for upper stage vehicle 116 and waste container 106 are indicated by line 1228 and line 1230 indicates various ISS phasing operations 1229 and ISS rendezvous proximity operations 1231 for multi-use tug 104 and attached cargo container 114 during which multi-use tug 104 may maneuver container 114 between, delivery orbit 1202, staging orbit 1204, a phasing orbit 1200, first co-elliptic orbit 804, second co-elliptic orbit 806, and the platform orbit (e.g., the ISS orbit) 808. Phasing operations 1229 and rendezvous proximity operations 1231 may be performed to properly align, position, and phase container 114 for berthing with space-based platform 112. Portion 1232 of the diagram of FIG. 12 shows maneuvering of cargo container 114 (with waste items therein) by multi-use tug 104 to loiter orbit 810. As shown in FIG. 12, the loiter orbit may be higher than the platform orbit, the platform orbit may be higher than the staging orbit, and the staging orbit may be higher than the delivery orbit.

Figure 13:
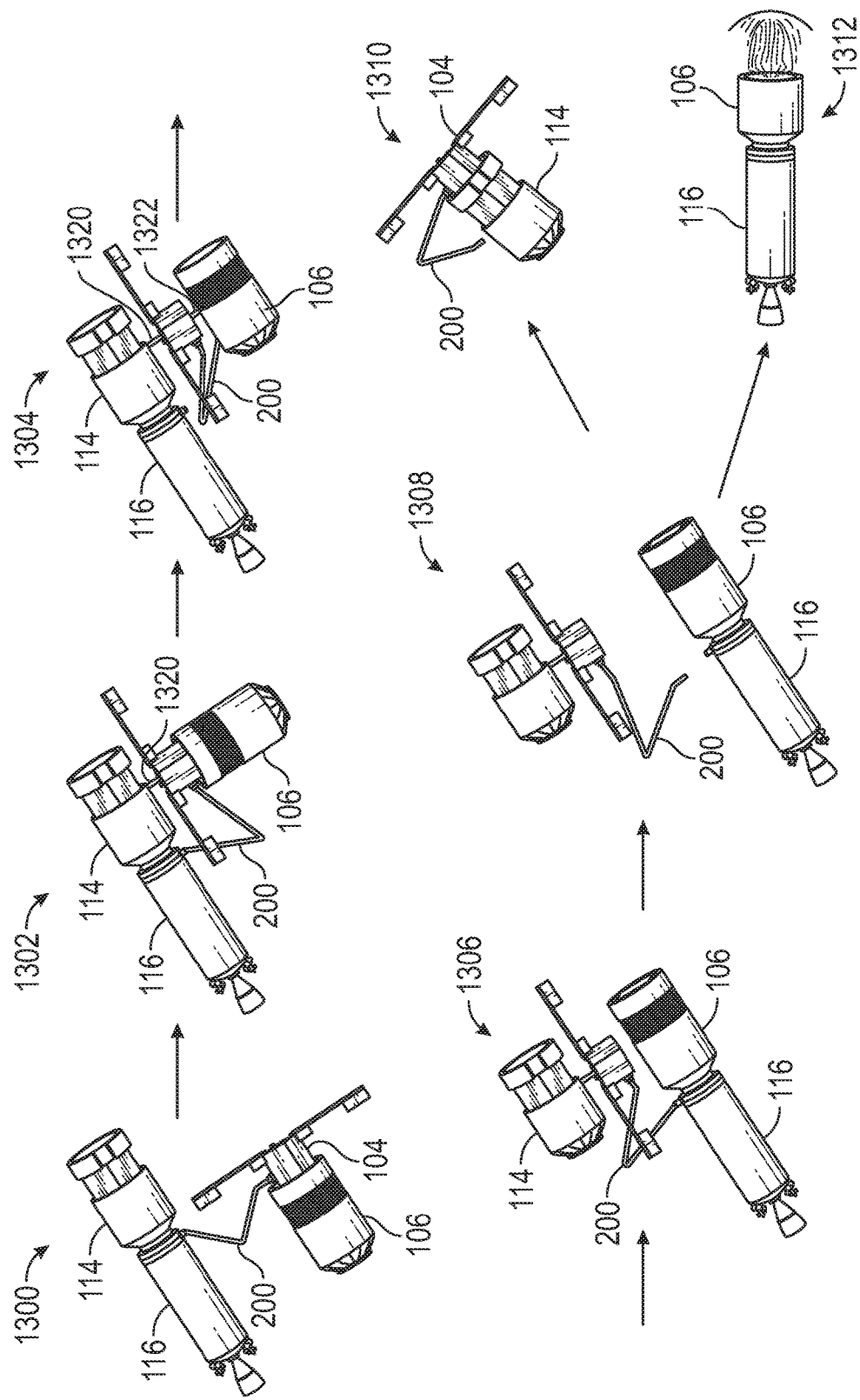
FIG. 13 is a flow diagram illustrating operations for swapping a cargo container and a waste container during a resupply use of a multi-use resupply system in accordance with certain aspects of the disclosure.

FIG. 13 is a diagram illustrating the configuration of various components of a multi-use resupply system at various stages of swap operations of a waste container and a new cargo container with a multi-use tug. As shown in FIG. 13, at stage 1300, once tug 104 and the disposal container 106 rendezvous with upper stage vehicle 116 and the arrival container 114 after launch, multi-use tug 104 approaches and station-keeps in proximity with the upper stage vehicle 116 inside the tug arm berthing box (e.g., using similar proximity operations used for ISS approach, only from a negative Rbar direction).

Supervised autonomy may be used during the free-flyer capture of the upper stage vehicle 108 by arm 200 due to the vehicle residual rates, latency and the time criticality of the operation. With the robotic arm 200 pre-positioned in a "ready for capture" stance, the robotic arm 200 may automatically align, track, and capture the upper stage vehicle 116, once the upper stage vehicle grapple is authorized by the spacecraft management computer, based on pre-established go/no-go criteria. This operation may employ vision tracking technology and techniques. Scripted operations with user-configurable "authority-to-proceed" pause points may be used for all maneuvering and berthing within the known and fixed workspace of the multi-use tug spacecraft.

Robotic arm ground station software may also allow an operator of arm 200 to command arm motion by interacting with a virtual certified model of environment and creating scripts that can be pre-validated on the ground and uplinked for execution by the flight segment.

Following capture, at stage 1302, multi-use tug 104 may be berthed to new cargo container 114 at attachment location 1320 (e.g., using berthing features and procedures, grappling features and procedures, and/or latching features and procedures at attachment location 1320).

At stage 1304, waste container 106 may be repositioned, using arm 200, to an orientation parallel to the orientation of container 114 at attachment location 1322 on an opposing side of tug 104 from container 114 (e.g., from an orientation substantially perpendicular to the orientation of container 114 as shown in stage 1302). In the new configuration, waste container 106 may be attached to attachment location 1322 (e.g., using berthing features and procedures, grappling features and procedures, and/or latching features and procedures at attachment location).

At stage 1306, grappling arm 200 may be used to move upper stage vehicle 116 from cargo container 114 to waste container 106 to be berthed to the waste container. The disposal container may berthed onto the upper stage vehicle 116 using a motorized latch mating mechanism (e.g., a latch mating mechanism as used on the Hubble Space Telescope for attachment of the NASA soft capture system). In this way, the grappling arm may be configured to capture the cargo container and an attached launch vehicle upper stage, position the cargo container for coupling to second attachment features on the tug, and move the launch vehicle upper stage from the cargo container to the waste cargo container while the waste cargo container is coupled to first attachment features on the tug and the cargo container is coupled to second attachment features during space-based operations of the multi-use tug.

At stage 1308, arm 200 may release upper stage vehicle 116 and waste container 106. At stage 1310, arm 200 may be used to reposition cargo container 114 from attachment location 1320 to a new orientation at attachment location 1322 such that container 114 is attached at an end to tug 104 for delivery to space-based platform 112 (e.g., by guidance and propulsion systems of tug 104 maneuvering the cargo container 114 to the space-based platform 112). At stage 1312, upper stage vehicle 116 may perform a controlled reentry with the disposal container 106.

Figure 14:
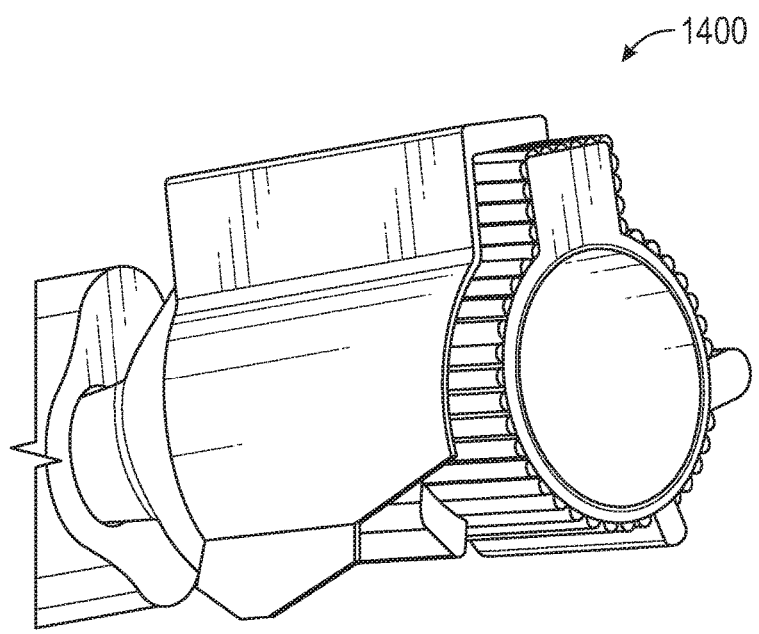
FIG. 14 is a perspective view of an illustrative end effector that may be used in a multi-use resupply system in accordance with certain aspects of the disclosure.
Figure 15:
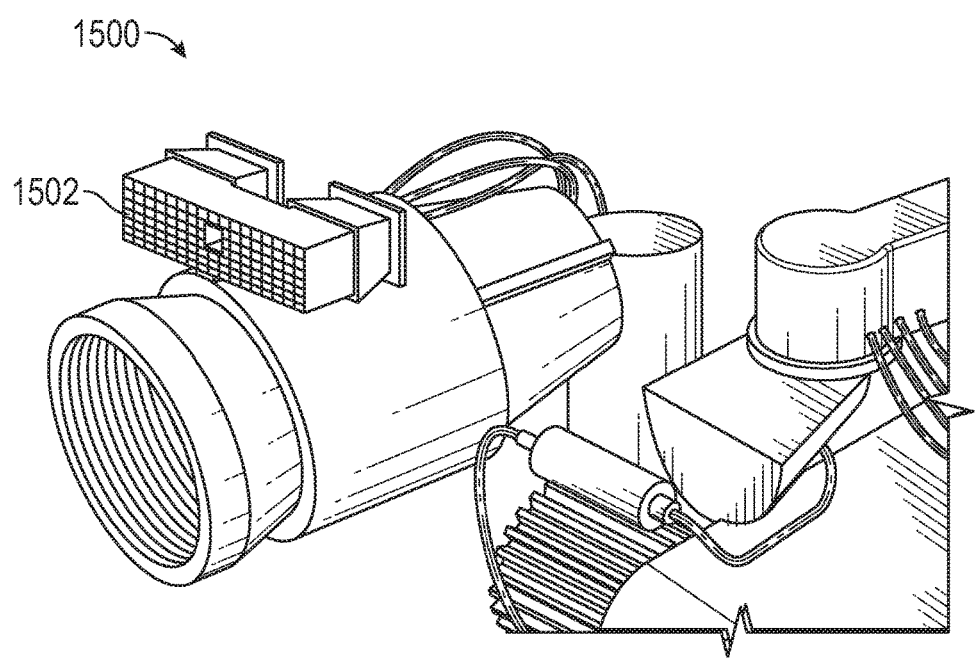
FIG. 15 is a perspective view of an illustrative berthing alignment system that may be used in a multi-use resupply system in accordance with certain aspects of the disclosure.
Figure 16:
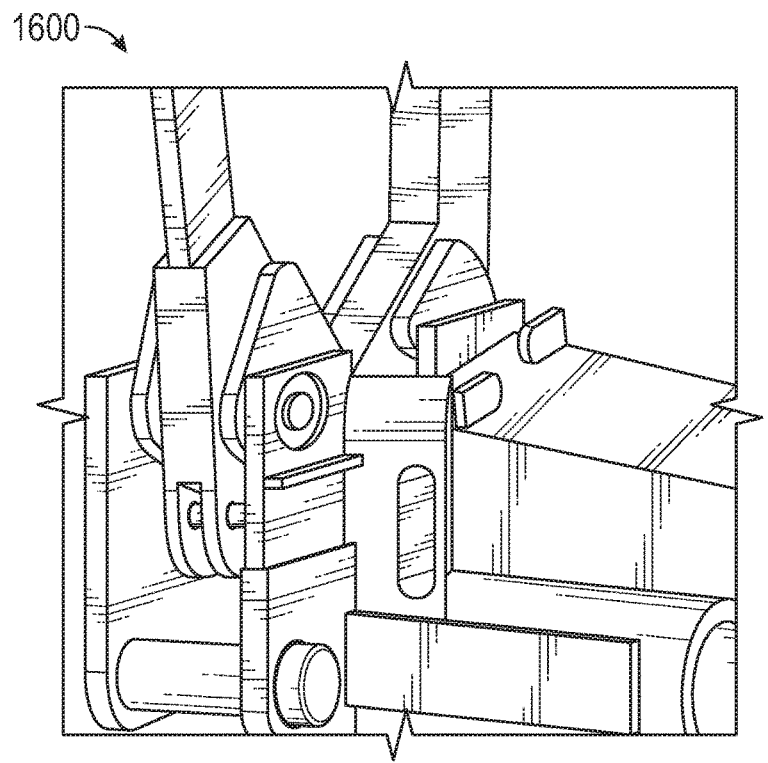
FIG. 16 is a perspective view of illustrative latches that may be used in a multi-use resupply system in accordance with certain aspects of the disclosure.
Figure 17:
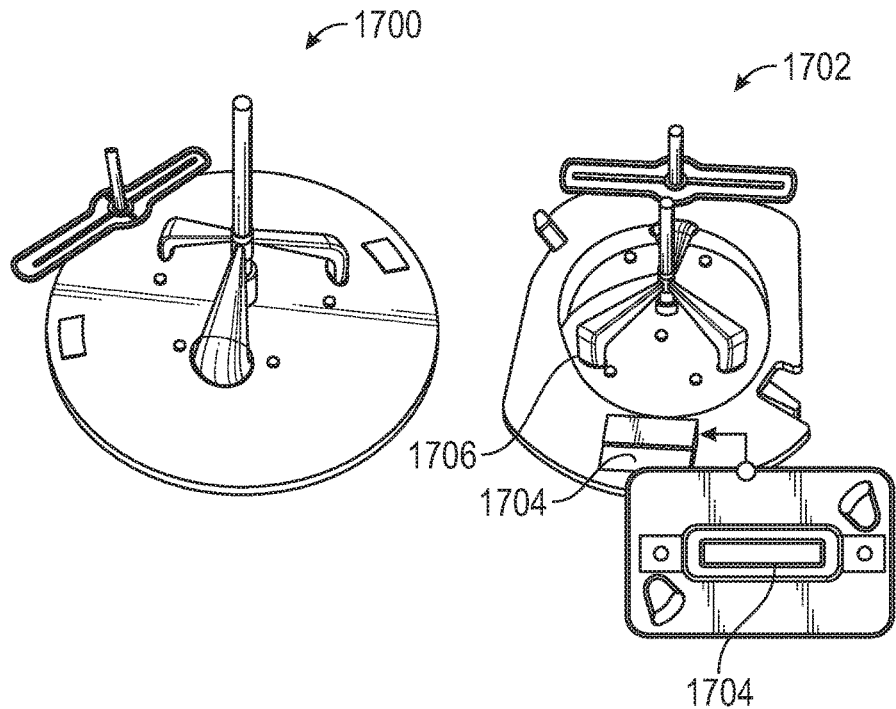
FIG. 17 is a perspective view of illustrative grapple fixtures that may be used in a multi-use resupply system in accordance with certain aspects of the disclosure.

Examples of systems that may be used for the robotic exchange operations are shown in FIGS. 14-17. FIG. 14 shows an exemplary end effector 1400 that may be used by multi-use tug for capturing, attaching, and/or releasing a container or upper stage vehicle. FIG. 15 shows a berthing alignment system 1500 that includes visual systems 1502 for guidance during berthing operations. Exemplary motorized latches 1600 that may be used for berthing upper stage vehicle 116 to waste container 106 are shown in FIG. 16. FIG. 17 shows grapple features 1700 and 1702 that may be captured and used to align and secure a cargo container and/or upper stage vehicle to one or more locations on multi-use tug 104. As shown, grappling features 1702 may include mechanical fixtures 1706 and electrical fixtures 1704 shown in an enlarged inset in FIG. 17.

A reference to an element in the singular is not intended to mean one and only one unless specifically so stated, but rather one or more. For example, a clock signal may refer to one or more clock signals, a control signal may refer to one or more control signals, an input signal may refer to one or more input signals, an output signal may refer to one or more output signals, and a signal may refer to differential voltage signals.

Unless specifically stated otherwise, the term some refers to one or more. Pronouns in the masculine (e.g., his) include the feminine and neuter gender (e.g., her and its) and vice versa. Headings and subheadings, if any, are used for convenience only and do not limit the invention.

The word exemplary is used herein to mean serving as an example or illustration. Any aspect or design described herein as exemplary is not necessarily to be construed as preferred or advantageous over other aspects or designs. In one aspect, various alternative configurations and operations described herein may be considered to be at least equivalent.

Phrases such as an aspect, the aspect, another aspect, some aspects, one or more aspects, an implementation, the implementation, another implementation, some implementations, one or more implementations, an embodiment, the embodiment, another embodiment, some embodiments, one or more embodiments, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

In one aspect, unless otherwise stated, all measurements, values, ratings, positions, magnitudes, sizes, and other specifications that are set forth in this specification, including in the claims that follow, are approximate, not exact. In one aspect, they are intended to have a reasonable range that is consistent with the functions to which they relate and with what is customary in the art to which they pertain. In one aspect, some of the dimensions are for clarity of presentation and are not to scale.

In one aspect, a term coupled or the like may refer to being directly coupled. In another aspect, a term coupled or the like may refer to being indirectly coupled.

Terms such as top, bottom, front, rear, side, horizontal, vertical, and the like refer to an arbitrary frame of reference, rather than to the ordinary gravitational frame of reference. Thus, such a term may extend upwardly, downwardly, diagonally, or horizontally in a gravitational frame of reference.

A phrase "at least one of" preceding a series of items, with the terms "and" or "or" to separate any of the items, modifies the list as a whole, rather than each member of the list (i.e., each item). The phrase "at least one of" does not require selection of at least one item; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

In one or more aspects, the terms "substantially" and "approximately" may provide an industry-accepted tolerance for their corresponding terms and/or relativity between items. Such an industry-accepted tolerance may range from less than one percent to percent.

Various items may be arranged differently (e.g., arranged in a different order, or partitioned in a different way) all without departing from the scope of the subject technology. In one aspect of the disclosure, the elements recited in the accompanying claims may be performed by one or more modules or sub-modules.

It is understood that the specific order or hierarchy of steps, operations or processes disclosed is an illustration of exemplary approaches. Based upon design preferences, it is understood that the specific order or hierarchy of steps, operations or processes may be rearranged. Some of the steps, operations or processes may be performed simultaneously. Some or all of the steps, operations, or processes may be performed automatically, without the intervention of a user. The accompanying method claims, if any, present elements of the various steps, operations or processes in a sample order, and are not meant to be limited to the specific order or hierarchy presented.

The disclosure is provided to enable any person skilled in the art to practice the various aspects described herein. The disclosure provides various examples of the subject technology, and the subject technology is not limited to these examples. Various modifications to these aspects will be readily apparent to those skilled in the art, and the generic principles defined herein may be applied to other aspects.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using a phrase means for or, in the case of a method claim, the element is recited using the phrase step for. Furthermore, to the extent that the term include, have, or the like is used, such term is intended to be inclusive in a manner similar to the term comprise as comprise is interpreted when employed as a transitional word in a claim.

The Title, Background, Summary, Brief Description of the Drawings and Abstract of the disclosure are hereby incorporated into the disclosure and are provided as illustrative examples of the disclosure, not as restrictive descriptions. It is submitted with the understanding that they will not be used to limit the scope or meaning of the claims. In addition, in the Detailed Description, it can be seen that the description provides illustrative examples and the various features are grouped together in various embodiments for the purpose of streamlining the disclosure. This method of disclosure is not to be interpreted as reflecting an intention that the claimed subject matter requires more features than are expressly recited in each claim. Rather, as the following claims reflect, inventive subject matter lies in less than all features of a single disclosed configuration or operation. The following claims are hereby incorporated into the Detailed Description, with each claim standing on its own as a separately claimed subject matter.

The claims are not intended to be limited to the aspects described herein, but is to be accorded the full scope consistent with the language claims and to encompass all legal equivalents. Notwithstanding, none of the claims are intended to embrace subject matter that fails to satisfy the requirement of 35 U.S.C. §101, 102, or 103, nor should they be interpreted in such a way. Any unintended embracement of such subject matter is hereby disclaimed.

What is claimed is:

1. A multi-use tug, comprising:
   first attachment features configured for coupling a first cargo container at a first attachment location;
   second attachment features configured for coupling a second cargo container at a second attachment location; and
   a grappling arm configured to capture the second cargo container and an attached launch vehicle upper stage, position the second cargo container for coupling to the second attachment features, and move the launch vehicle upper stage from the second cargo container to the first cargo container while the first cargo container is coupled to the first attachment features and the second cargo container is coupled to the second attachment features during space-based operations of the multi-use tug.

2. The multi-use tug of claim 1, further comprising guidance and propulsion systems configured to maneuver the second cargo container to a space-based platform following a release, with the grappling arm, of the first cargo container and the launch vehicle upper stage.

3. The multi-use tug of claim 2, wherein the grappling arm is configured to capture the second cargo container and the attached launch vehicle upper stage at a delivery orbit of the second cargo container and the attached launch vehicle upper stage, and wherein the guidance and propulsion systems are configured to maneuver the second cargo container from the delivery orbit to a platform orbit of the space-based platform.

4. The multi-use tug of claim 3, wherein the space-based platform is a manned space station.

5. The multi-use tug of claim 4, wherein the first cargo container contains waste items from the manned space station and wherein the second cargo container contains supply items for the manned space station.

6. The multi-use tug of claim 3, wherein the grappling arm is further configured to reposition the first cargo container from a first orientation at the first attachment location to a second orientation at the first attachment location prior to moving the launch vehicle upper stage from the second cargo container to the first cargo container.

7. The multi-use tug of claim 6, wherein the first orientation is substantially perpendicular to an orientation of the second cargo container, and wherein the second orientation is substantially parallel to the orientation of the second cargo container.

8. The multi-use tug of claim 7, wherein the grappling arm is further configured to move the second cargo container from the second attachment location to the first attachment location before the guidance and propulsion systems maneuver the second cargo container to the space-based platform.

9. The multi-use tug of claim 3, wherein the guidance and propulsion systems are configured to maneuver the first cargo container from the space-based platform to a loiter orbit and to maintain the first cargo container at the loiter orbit until a launch time of a launch, to the delivery orbit, of the second cargo container and the attached launch vehicle upper stage.

10. The multi-use tug of claim 9, wherein the guidance and propulsion systems are configured to maneuver the first cargo container from the loiter orbit to a staging orbit at or near the launch time of the launch, to the delivery orbit, of the second cargo container and the attached launch vehicle upper stage.

11. The multi-use tug of claim 10, wherein the loiter orbit is higher than the platform orbit, wherein the platform orbit is higher than the staging orbit, and wherein the staging orbit is higher than the delivery orbit.

12. A method, comprising:
   maneuvering, with a multi-use tug, a first cargo container from a space-based platform to a delivery orbit;
   maneuvering, with a launch vehicle upper stage, a second cargo container to the delivery orbit;
   swapping, with a grappling arm of the multi-use tug, the launch vehicle upper stage from the second cargo container to the first cargo container;
   de-orbiting the first cargo container with the launch vehicle upper stage; and maneuvering, with the multi-use tug, the second cargo container from the delivery orbit to the space-based platform.

13. The method of claim 12, further comprising, prior to maneuvering, with the multi-use tug, the first cargo container from the space-based platform to the delivery orbit:
    maneuvering, with the multi-use tug, the first cargo container from an additional delivery orbit to the space-based platform;
    maneuvering, with the multi-use tug, the first cargo container from the space-based platform to a loiter orbit; and
    maintaining the first cargo container at the loiter orbit until a launch of the second cargo container and the launch vehicle upper stage.

14. The method of claim 13, further comprising, after maneuvering, with the multi-use tug, the second cargo container from the delivery orbit to the space-based platform, maneuvering the second cargo container from the space-based platform to the loiter orbit.

15. The method of claim 13, further comprising, prior to maneuvering, with the multi-use tug, the first cargo container from the space-based platform to the loiter orbit:
    moving cargo from the first cargo container to the space-based platform; and
    moving waste items from the space-based platform to the first cargo container.

16. The method of claim 12, wherein swapping, with the grappling arm of the multi-use tug, the launch vehicle upper stage from the second cargo container to the first cargo container comprises:
    attaching the second cargo container to the multi-use tug while the first cargo container is attached to the multi-use tug; and
    moving, with the grappling arm, the launch vehicle upper stage from the second cargo container to the first cargo container while the first cargo container and the second cargo container are attached to the multi-use tug.

17. The method of claim 16, wherein swapping, with the grappling arm of the multi-use tug, the launch vehicle upper stage from the second cargo container to the first cargo container further comprises reorienting the first cargo container prior to moving the launch vehicle upper stage.

18. The method of claim 12, wherein de-orbiting the first cargo container with the launch vehicle upper stage comprises performing a de-orbit burn with the launch vehicle upper stage while the first cargo container is attached to the launch vehicle upper stage.

* * * * *